United States Patent
Kawana

(10) Patent No.: US 10,152,659 B2
(45) Date of Patent: Dec. 11, 2018

(54) PRINTING APPARATUS, USER INTERFACE SCREEN DISPLAYING METHOD, AND MEDIUM

(71) Applicant: CANON KABUSHIKI KAISHA, Tokyo (JP)

(72) Inventor: Tomoyuki Kawana, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/160,687

(22) Filed: May 20, 2016

(65) Prior Publication Data
US 2016/0350637 A1 Dec. 1, 2016

(30) Foreign Application Priority Data

May 28, 2015 (JP) ................... 2015-108697

(51) Int. Cl.
| | | |
|---|---|---|
| B41J 2/175 | (2006.01) | |
| G06K 15/00 | (2006.01) | |
| H04N 1/00 | (2006.01) | |
| B41J 3/46 | (2006.01) | |
| B41J 2/435 | (2006.01) | |

(52) U.S. Cl.
CPC .......... *G06K 15/4075* (2013.01); *B41J 2/175* (2013.01); *B41J 2/17566* (2013.01); *B41J 2/435* (2013.01); *B41J 3/46* (2013.01); *G06K 15/005* (2013.01); *H04N 1/00037* (2013.01); *H04N 1/0049* (2013.01)

(58) Field of Classification Search
CPC ........................................................ B41J 3/46
See application file for complete search history.

(56) References Cited

U.S. PATENT DOCUMENTS

| | | | | |
|---|---|---|---|---|
| 6,223,131 | B1* | 4/2001 | Kanaya | B41J 2/17513 347/7 |
| 2005/0007606 | A1* | 1/2005 | Miyasaka | B41J 3/4075 358/1.1 |
| 2006/0071952 | A1* | 4/2006 | Motominami | B41J 2/1752 347/5 |
| 2006/0132514 | A1* | 6/2006 | Honda | G03G 15/105 347/7 |
| 2007/0201050 | A1* | 8/2007 | Mochizuki | H04N 1/00408 358/1.1 |
| 2007/0285446 | A1* | 12/2007 | Shinada | B41J 2/17546 347/7 |

(Continued)

FOREIGN PATENT DOCUMENTS

| | | |
|---|---|---|
| JP | H03-32851 | 2/1991 |
| JP | 4484026 | 6/2010 |

*Primary Examiner* — Shelby L Fidler
(74) *Attorney, Agent, or Firm* — Fitzpatrick, Cella, Harper & Scinto

(57) ABSTRACT

An object of the present invention is to make it possible for a user to correctly exchange color material containers of a printing apparatus. The printing apparatus of the present invention is a printing apparatus to which a plurality of user-exchangeable color material containers is attached, and which includes a display unit configured to display a user interface screen having an operation guide display area in which contents explaining a color material container exchange procedure are displayed and an icon display area in which an icon indicating a color material container to be exchanged is displayed.

28 Claims, 16 Drawing Sheets

(56) References Cited

U.S. PATENT DOCUMENTS

| | | | | |
|---|---|---|---|---|
| 2008/0252670 A1* | 10/2008 | LaBar | ................... | B41J 2/1752 347/9 |
| 2013/0077111 A1* | 3/2013 | Yasui | ................ | H04N 1/00408 358/1.12 |
| 2014/0153027 A1* | 6/2014 | Nakamura | ......... | H04N 1/00663 358/1.14 |

* cited by examiner

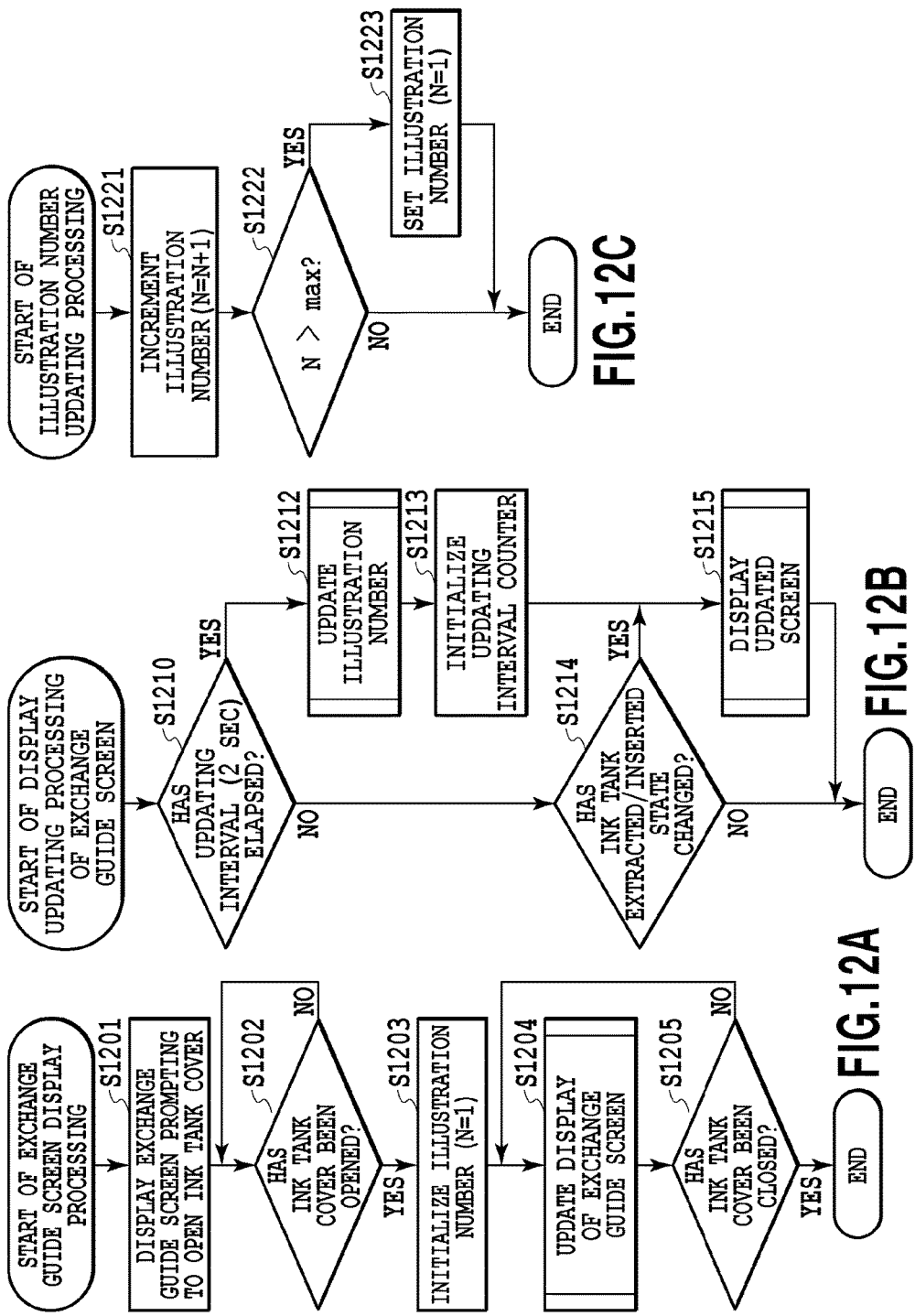

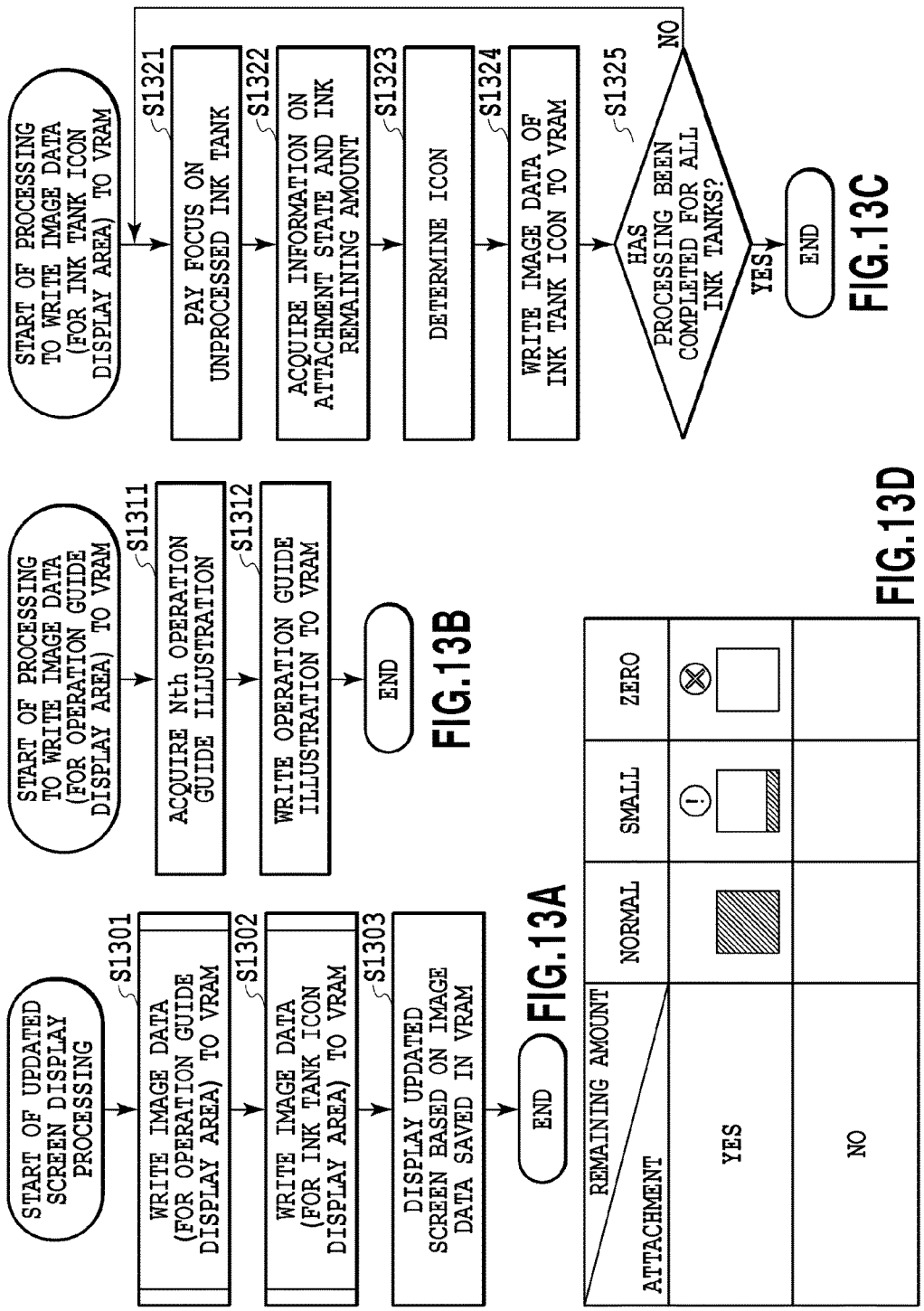

| ATTACHMENT \ REMAINING AMOUNT | NORMAL | SMALL | ZERO |
|---|---|---|---|
| YES | ▨ | ⊡! | ⊠ |
| NO | ▨ | ⊡! (dashed) | ⊠ (dashed) |

FIG.15

PRINTING APPARATUS, USER INTERFACE SCREEN DISPLAYING METHOD, AND MEDIUM

BACKGROUND OF THE INVENTION

Field of the Invention

The present invention relates to a printing apparatus to which a user-exchangeable color material container is attached.

Description of the Related Art

Among printers, there is a printer that enters an error state in the case where consumables, such as ink and sheets, run out and it is not possible to use the printer temporarily until the exchange or replenishment of consumables by a user is completed. The occurrence of such an error state may be a factor that reduces the productivity in the entire business, not only in printing, in the case where the printer is a shared printer or a business printer in an office. Because of this, it is very important for a printer to have such a capability that enables a user to quickly and securely exchange or replenish consumables by immediately notifying the user of the run-out of consumables even in the case where the user is not familiar with the operation.

In particular, the error caused by the run-out of ink is one of the errors relating to consumables that happen frequently as compared with errors relating to other consumables. Because of this, a variety of techniques have been developed hitherto relating to the notification of the ink remaining amount and the ink exchange operation.

As an example of the technique to notice the ink remaining amount, Japanese Patent No. 4484026 has disclosed the invention having the remaining amount display unit configured to collectively display information on all the ink tanks outside the main body outer cover, in addition to the remaining amount display unit configured to display information on individual ink tanks within the main body outer cover. Further, Japanese Patent Laid-Open H03-32851 (1991) has disclosed the method of displaying whether the black ink or the color ink has run out by making the lighting period of one LED differ.

On the other hand, as an example of the technique relating to the ink exchange operation, the invention has been disclosed that enables the operation without manuals by displaying figures or photos on the operation unit of the ink jet printing apparatus.

Further, the printer that displays the ink remaining amount on the display unit, such as the liquid crystal display (abbreviated to LCD), in the printer operation unit has been devised.

SUMMARY OF THE INVENTION

For a UI screen display on an LCD or the like of a printing apparatus, it is possible to design a comparatively flexible layout by software, but there is a case where the size of the LCD is limited, and therefore, the contents that are displayed simultaneously at certain timing are limited. For example, at the time of the color material container exchange operation, it is necessary to preferentially display instructions for opening or closing the cover that covers the color material containers, the guide of the operation method, and the explanation of how to extract and insert the color material container. Consequently, during the displays of those, there is a case where it is not possible for a user to check the remaining amount within the color material container on the screen. In particular, in the printing apparatus that uses a number of color materials, there is a possibility that a number of color materials run out at the same time, and therefore, it is difficult for a user to correctly memorize all the color material containers to be exchanged before the exchange operation and to extract all the color material containers to be exchanged with no mistake and to exchange the color material containers.

The printing apparatus of the present invention is a printing apparatus to which a plurality of user-exchangeable color material containers is attached and includes a display unit configured to display a user interface screen having an operation guide display area in which the contents explaining the color material container exchange procedure are displayed and an icon display area in which an icon that indicates a color material container to be exchanged is displayed.

Further features of the present invention will become apparent from the following description of exemplary embodiments (with reference to the attached drawings).

BRIEF DESCRIPTION OF THE DRAWINGS

FIG. 12A, FIG. 12B, and FIG. 12C are each a flowchart of exchange guide screen display processing;

FIG. 13A, FIG. 13B, FIG. 13C, and FIG. 13D are each an explanatory diagram of updated screen display processing;

FIG. 15 is a table that holds icons indicating an ink tank state; and

DESCRIPTION OF THE EMBODIMENTS

Hereinafter, with reference to the drawings, embodiments of the present invention are explained in detail. However, the following embodiments do not limit the present invention and all the combinations of the features explained below are not necessarily indispensable to the solutions of problems of the present invention. Explanation is given by attaching the same symbol to the same configuration.

First Embodiment (Configuration of Printing Apparatus)

Figure 1A:
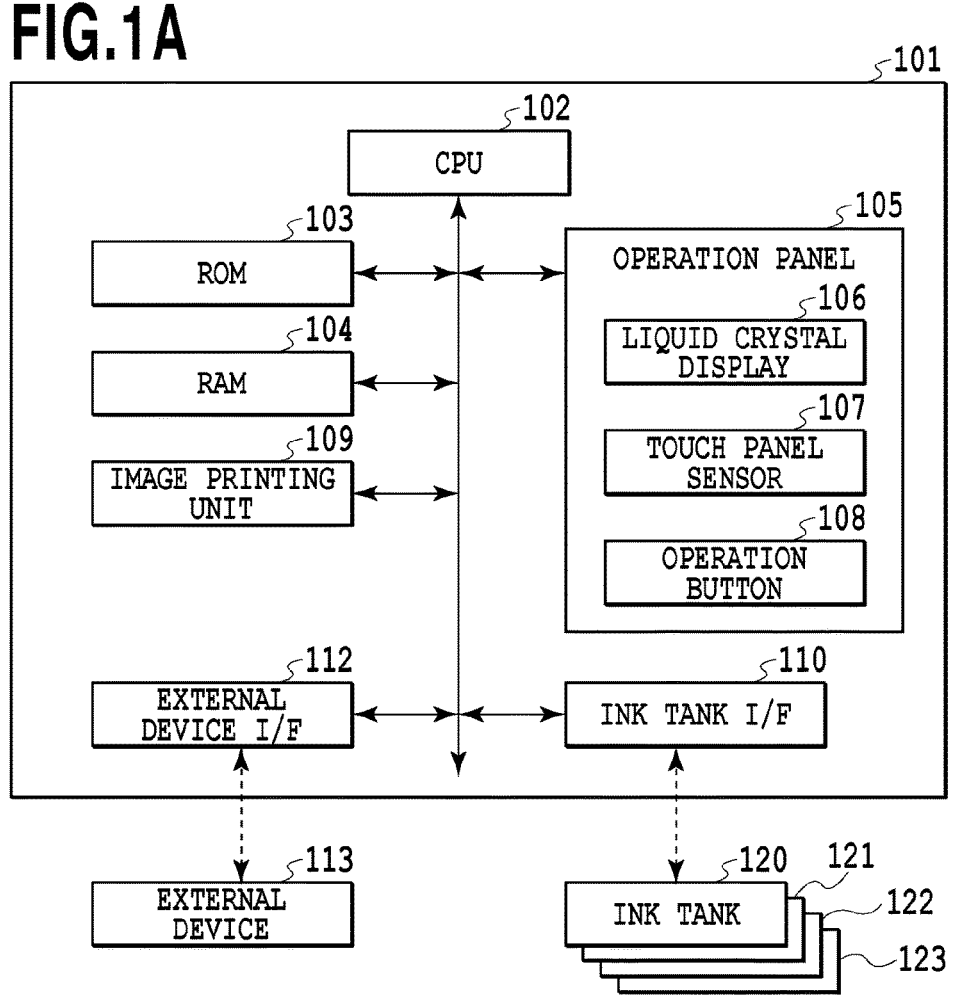
FIG. 1A and FIG. 1B are diagrams each showing a configuration of a printing apparatus.

FIG. 1A is a block diagram of a printing apparatus 101 according to a first embodiment. As shown in FIG. 1A, the printing apparatus 101 includes a CPU 102, a ROM 103, a RAM 104, an operation panel 105, an image printing unit 109, an ink interface (abbreviated to "I/F") 110, and an external device I/F 112.

The CPU 102 develops a program stored in the ROM 103 or a hard disk (hereinafter, HDD), not shown, on the RAM 104 and executes the developed program. Due to this, the CPU 102 centralizedly controls each component and causes the printing apparatus 101 to operate.

In the ROM 103, programs for controlling the operation of the printing apparatus 101 are stored. The programs include a program for performing processing according to the present embodiment, to be described later. The RAM 104 is used to develop the program stored in the ROM 103 and functions as a work memory.

The operation panel 105 includes a liquid crystal display 106, a touch panel sensor 107, and an operation button 108. The liquid crystal display 106 displays a state of the printing apparatus 101 (e.g., an error state, such as ink run-out, paper jam, etc.), a menu screen in accordance with an operation of a user, a check screen to prompt a user to check, etc. The touch panel sensor 107 is a sensor for detecting an operation by a finger or the like of a user (e.g., pressing-down). The operation button 108 is a button that is pressed down by a user to give the printing apparatus instructions and includes a power source button, a home button, etc. (details will be described later).

The image printing unit 109 ejects ink based on image data and forms an image on a printing medium, such as a sheet. The ink tank I/F 110 controls ink supply from an ink tank that is attached to the printing apparatus 101 in an attachable/detachable manner to the print head of the image printing unit 109 in accordance with instructions from the CPU 102. In the present embodiment, it is assumed that a yellow (hereinafter, Y) ink tank 120, a magenta (hereinafter, M) ink tank 121, a cyan (hereinafter, C) ink tank 122, and a black (hereinafter, K or BK) ink tank 123 are attached to the printing apparatus 101.

The external device I/F 112 is an interface for enabling transmission and reception of data with an external device 113, such as a personal computer and a server, and as the interface, for example, there are a wired LAN, wireless LAN, USB, etc.

Figure 1B:
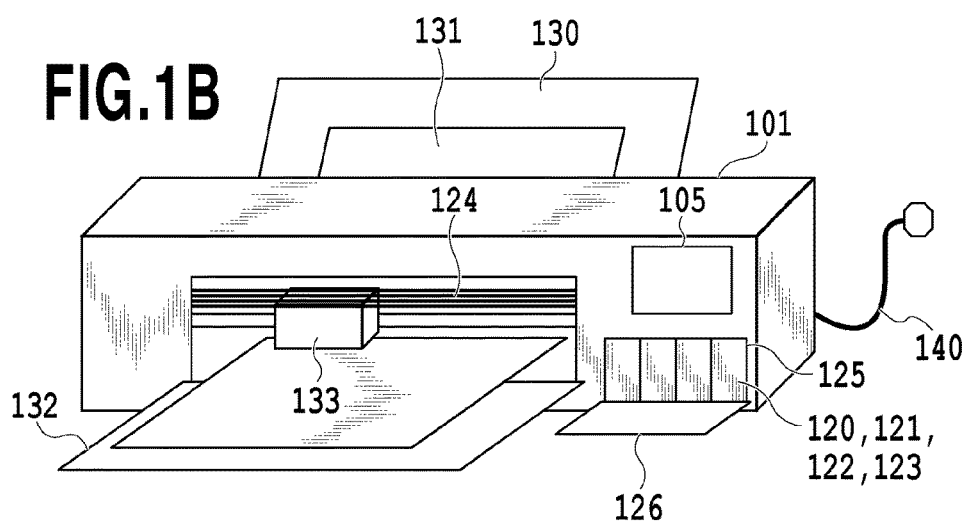

FIG. 1B is a perspective view of the printing apparatus 101 according to the first embodiment. As shown in FIG. 1B, the printing apparatus 101 includes the operation panel 105, a paper feed tray 130, a paper discharge tray 132, a carriage unit 133, and an AC cable 140.

The operation panel 105 is provided on the left of the front of the printing apparatus 101. A user performs inputting to the printing apparatus 101 via the operation panel 105 and information is presented by the printing apparatus 101.

A sheet 131 placed on the paper feed tray 130 is fed to the image printing unit 109 and the sheet 131 on which an image is formed by the image printing unit 109 is stacked on the paper discharge tray 132.

The carriage 133 is a module constituting the image printing unit 109. The image printing unit 109 forms a desired image by repeating paper feeding by a line feed (abbreviated to LF) motor, carriage movement by a carriage (abbreviated to CR) motor, and ink ejection by the drive of the print head on the carriage unit 133. At this time, ink is supplied to the print head on the carriage unit 133 under the control of the ink tank I/F 110 from each of the ink tanks 120 to 123 of each color of YMCK that are attached to an ink tank insertion port 125 via an ink tube 124 for each color. The printing apparatus 101 also includes an ink tank cover 126 that opens and closes the ink tank insertion port 125 and a photodiode type open/close sensor (not shown) that detects the open/closed state of the cover.

The AC cable 140 is a cable for connecting a power source unit (not shown) provided at the rear of the printing apparatus 101 and a power source outlet.

(Configuration of Operation Panel)

Figure 2A:
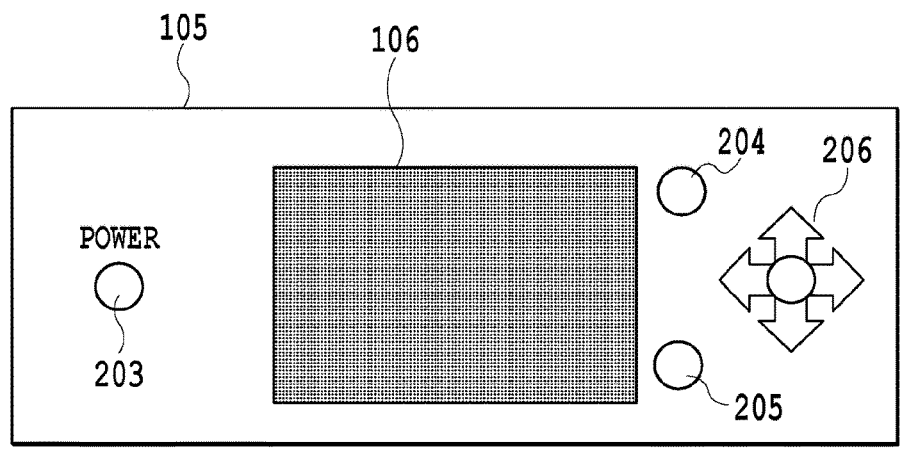
FIG. 2A and FIG. 2B are diagrams each showing a configuration of an operation panel of the printing apparatus.

FIG. 2A is an enlarged front view of the operation panel 105 of the printing apparatus 101 according to the first embodiment. As shown in FIG. 2A, the operation panel 105 includes, as operation buttons, a power source button 203, a home button 204, a return button 205, and a graphical user interface (hereinafter, GUI) operation button 206. Further, in the center of the operation panel 105, the liquid crystal display 106 is provided.

In the case where the power source button 203 is pressed down, the power source of the printing apparatus 101 is turned on or turned off.

The home button 204 is button that is used in the case where a user is confused about which operation to perform or the like. In the case where the home button 204 is pressed down, a home screen is displayed on the liquid crystal display 106. The home screen is a screen that is displayed after the printing apparatus 101 is activated and is a screen on which every operation starts.

The return button 205 is a button that is used in the case where a user desires to perform an operation again. In the case where the return button 205 is pressed down, the screen that was displayed immediately before the user gives instructions is displayed again on the liquid crystal display 106.

The GUI operation button 206 is a button that is used for performing an operation on a GUI screen that is displayed on the liquid crystal display 106, and includes a cross button and an OK button at the center of the cross button. For example, in the case where the cross button is pressed down, the focus moves on the screen and in the case where the OK button is pressed down, an item being selected is settled.

Figure 2B:
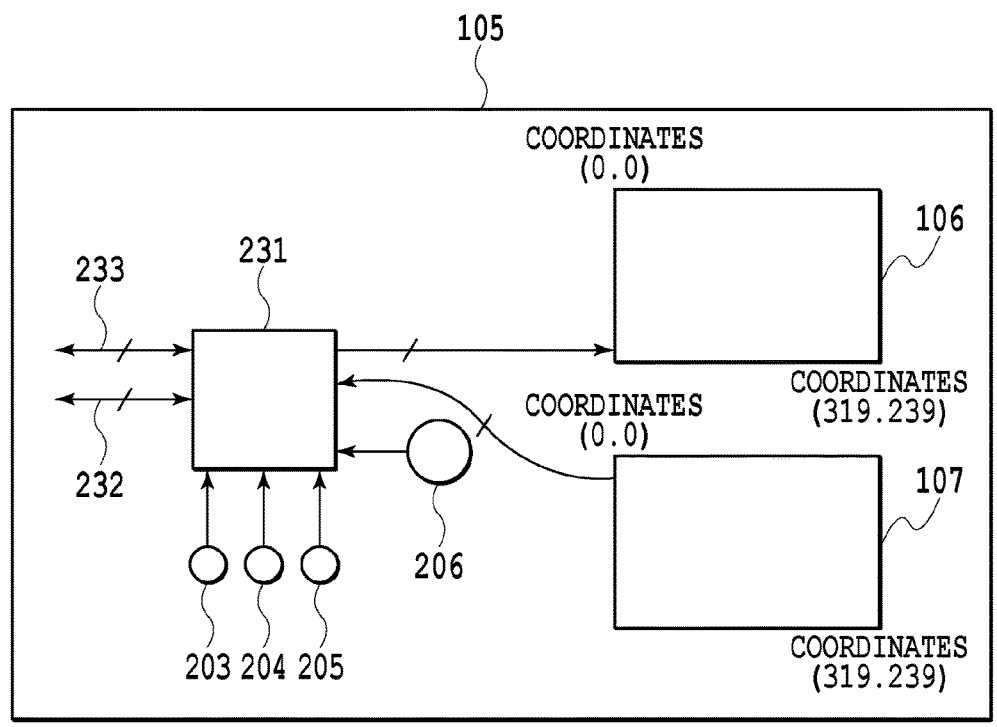

FIG. 2B is an electrical block diagram of the operation panel 105. The operation panel 105 includes the liquid crystal display 106, the touch panel sensor 107, the various buttons 203 to 206, and a one-chip microcomputer 231 that controls a data output to the liquid crystal display 106 and a data input from the touch panel sensor 107.

The liquid crystal display 106 is a display of QVGA size (320×240). In the present embodiment, a coordinate system is set in which the top-left corner of the display is the origin (0, 0) and the coordinates of the bottom-right corner of the display are (319, 239).

The one-chip microcomputer 231 detects the input state of the touch panel sensor 107 and the various buttons 203 to 206 at fixed periods and transmits the detection results to the CPU 102 via an I2C serial bus 232.

The CPU 102 creates display data in accordance with the information that is input via the operation panel 105 and various external events and saves the created display data in a frame buffer within the RAM 104. The display data that is saved in the frame buffer is transmitted to the one-chip microcomputer 231 via an LVDS 233 and is converted in accordance with the output characteristics thereof. Then, a screen based on the converted data is displayed on the liquid crystal display 106.

(Mechanism Relating to Ink Supply)

Figure 3:
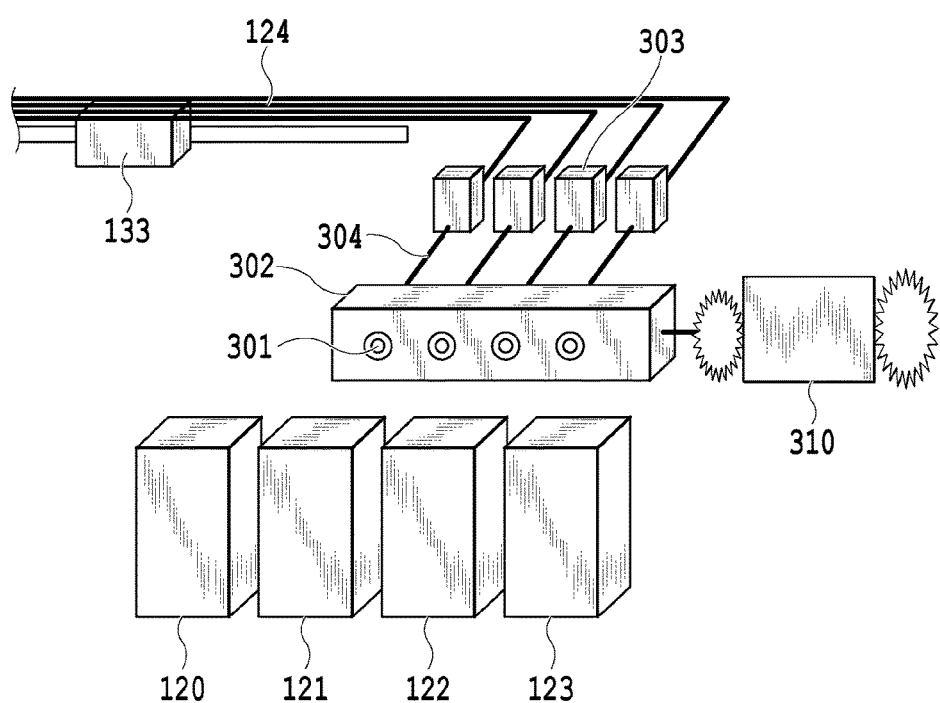
FIG. 3 is an explanatory diagram of a mechanism relating to ink supply.

FIG. 3 is an explanatory diagram of a mechanism relating to ink supply.

Each of the ink tanks 120 to 123 of each color of YMCK is coupled with a joint unit 301 including a valve structure for preventing a backflow and provided independently for each color at the ink tank insertion port 125 and is connected with a pump unit 302. From the opposite side of the surface of the pump unit 302 on which the joint unit 301 is arranged, an ink tube 304 extends, which serves as an ink path between the pump unit 302 and a sub tank 303. The pump unit 302 internally includes an ink tube, a valve that closes the outflow port of the ink tube, and a pressure unit for injecting ink into the sub tank 303 under pressure. In the case where an ink supply motor 310 rotates positively under the control of the CPU 102, pressure is applied to the ink flow path within the pump unit 302 and the ink within the ink tank is supplied to the sub tank 303.

(Configuration of Ink Tank)

Figure 4:
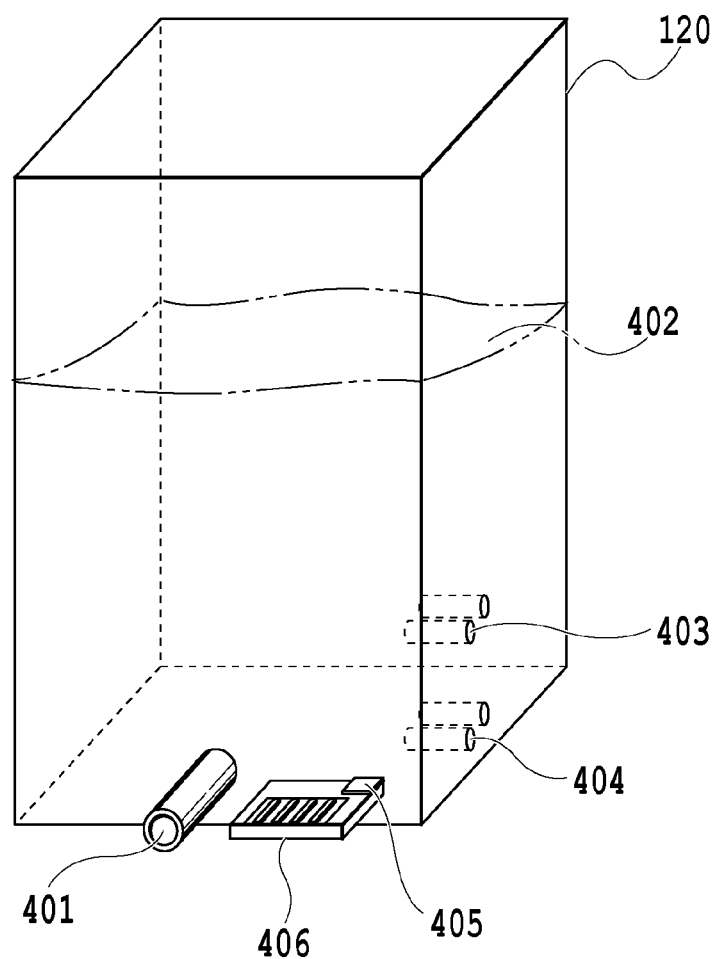
FIG. 4 is a schematic diagram showing a configuration of an ink tank.

FIG. 4 is a schematic diagram showing a configuration of the ink tank 120. As shown in FIG. 4, the ink tank 120 includes an ink tank supply port 401, liquid surface level sensors 403 and 404, a nonvolatile memory 405, and a connector 406. The ink tanks 121 to 123 each have the same configuration.

The ink tank supply port 401 is connected to the joint unit 301. The liquid surface level sensors 403 and 404 each include two pins and are capable of grasping the position (i.e., height) of an ink liquid surface 402 by detecting presence/absence of a conduction current between the two pins.

The liquid surface level sensor 403 and the liquid surface level sensor 404 are provided so that the heights thereof are different from each other and the liquid surface level sensor 403 is arranged at a position higher than that of the liquid surface level sensor 404. It is possible for the liquid surface level sensor 403 to detect that the ink reaming amount becomes small in the case where the ink liquid surface 402 becomes lower than the liquid surface level sensor 403. On the other hand, the liquid surface level sensor 404 is arranged at the bottom of the ink tank 120, and therefore, it is possible to detect that the ink remaining amount is zero.

In the nonvolatile memory 405, identification information unique to the ink tank 120 and data indicating the current ink remaining amount are saved.

The connector 406 is an electrical connector that connects electric circuits of the ink tank 120 and the printing apparatus 101. In the case where the ink tank supply port 401 is coupled correctly with the joint unit 301, the connector 406 and a connector (not shown) provided to the pump unit 302 are connected and transmission and reception of data between both are enabled. Due to this, it is made possible for the CPU 102 to access the liquid surface level sensors 403 and 404 and the nonvolatile memory 405 via the ink tank I/F 110.

Figure 5:
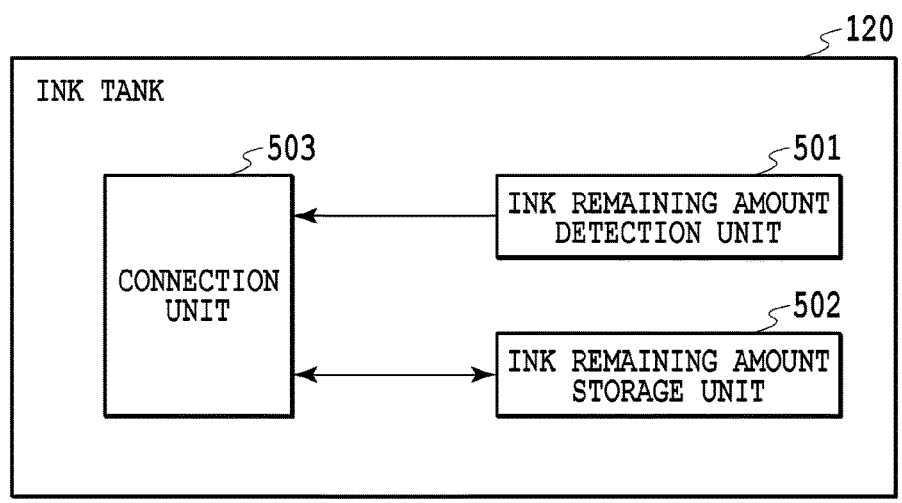
FIG. 5 is a block diagram showing a function configuration of the ink tank.

FIG. 5 is a block diagram showing a function configuration of the ink tank 120. As shown in FIG. 5, the ink tank 120 includes an ink remaining amount detection unit 501, an ink remaining amount storage unit 502, and a connection unit 503. The ink tanks 121 to 123 each have the same configuration.

The ink remaining amount detection unit 501 detects the ink remaining amount within the ink tank 120. Specifically, the ink remaining amount detection unit 501 includes the liquid surface level sensor 403 that detects that the ink remaining amount becomes small and the liquid surface level sensor 404 that detects that the ink remaining amount becomes zero.

However, the method of detecting the ink remaining amount of the ink remaining amount detection unit 501 is not limited to the method that uses sensors. For example, it may also be possible to detect the ink remaining amount by using the CPU 102 as an ink remaining amount detection unit, counting the amount of ejected ink for each ink color, and subtracting the amount of ejected ink from the amount of ink that is stored in an ink tank in the unused state. The amount of ink that is stored in an ink tank in the unused state is stored in the ROM 103 as, for example, a predetermined ink amount. In the case where ink tanks are exchanged by processing, to be described later, the CPU 102 resets the count value of the amount of ejected ink.

Further, it may also be possible to find the remaining amount by the CPU 10 comparing the amount of ejected ink with a predetermined threshold value instead of subtracting the amount of ejected ink from the predetermined ink amount as described above. For example, two threshold values corresponding to the ink remaining amount detected by the liquid surface level sensor 403 and the ink remaining amount detected by the liquid surface level sensor 404 are provided respectively, and the CPU 102 determines whether or not the count value has exceeded each threshold value. Due to this processing, it is possible to detect the ink remaining amount as in the case where sensors are used.

The ink remaining amount storage unit 502 stores the ink remaining amount within the ink tank 120. Specifically, the ink remaining amount storage unit 502 includes the nonvolatile memory 405.

The connection unit 503 connects the ink tank 120 and the printing apparatus 101. Specifically, the connection unit 503 includes the ink tank supply port 401 and the connector 406. In the case where the ink tank supply port 401 is coupled correctly with the joint unit 301, the CPU 102 is connected with the ink remaining amount detection unit 501 and the ink remaining amount storage unit 502 via the connection unit 503. Due to this, transmission and reception of data between the CPU 102 and the ink remaining amount detection unit 501 and between the CPU 102 and the ink remaining amount storage unit 502 are made possible.

(Function Configuration of Software)

Figure 6:
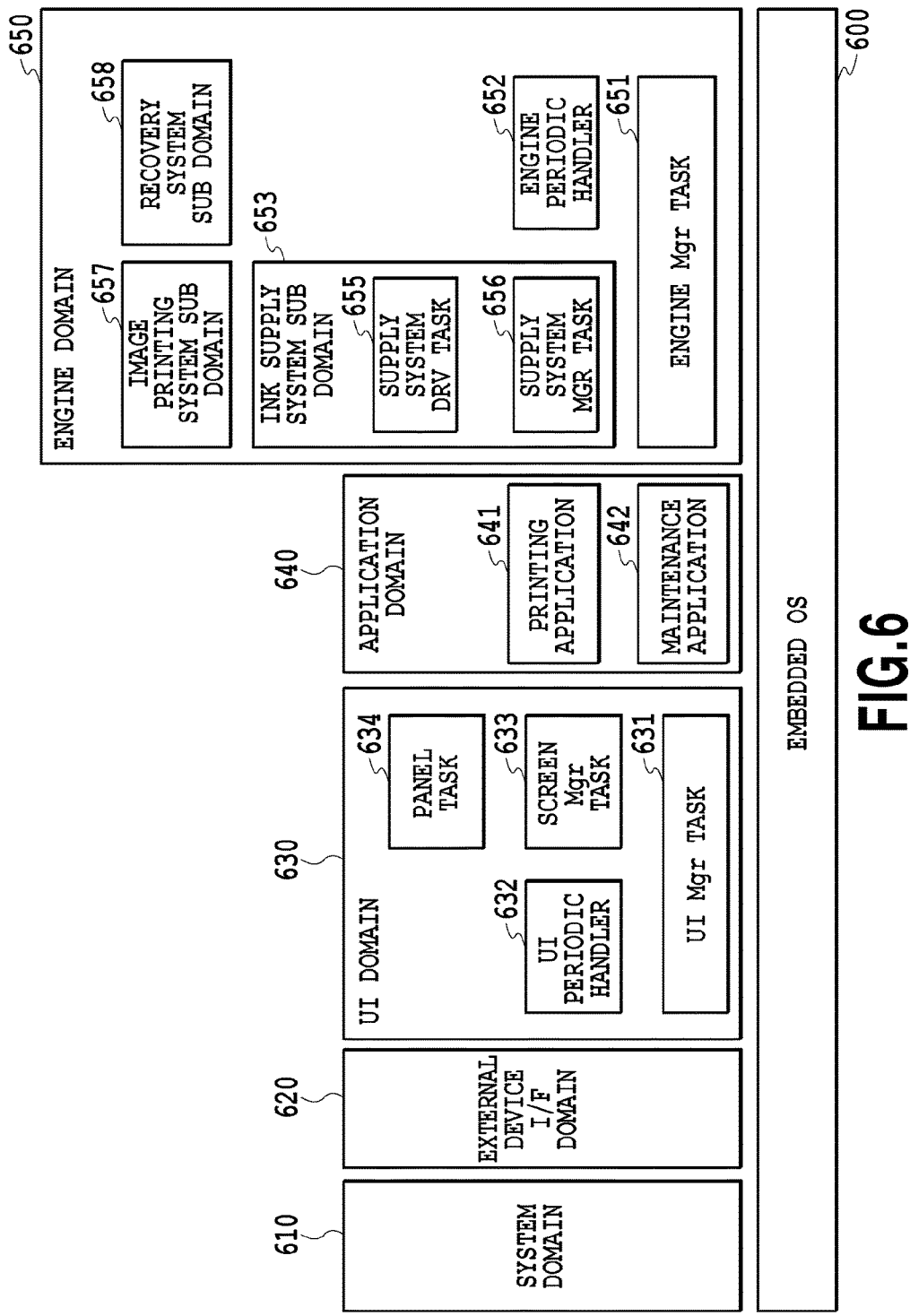
FIG. 6 is a block diagram showing a function configuration of software executed by a CPU.

FIG. 6 is a block diagram showing a function configuration of software executed by the CPU 102. As shown in FIG. 6, the software includes an embedded OS 600, a system domain 610 that runs on the embedded OS 600, an external device I/F domain 620, a UI domain 630, an application domain 640, and an engine domain 650. Here, the term domain is used so as to mean a set of functions.

The embedded OS 600 is an operating system for embedded equipment in conformity with the μItron standard. The system domain 610 controls the state transition relating to the entire printing apparatus 101 (e.g., the power source state transition by pressing down the power source button 203, and the state transition between the normal state and the idle state, between the idle state and the sleep state, and between the sleep state and the normal state). The external device I/F domain 620 controls the external device I/F 112.

The UI domain 630 (UI is the abbreviation for the user interface) includes a UIMgr task 631 (Mgr is the abbreviation for the manager) that manages the state transition by the UI domain 630. Further, the UI domain 630 includes a UI period handler 632, a screen Mgr task 633 that selectively displays a user interface screen (hereinafter, UI screen), and a panel task 634 that controls updating of display contents on the displayed UI screen.

The application domain 640 includes applications for each function to provide various services to a user. The application includes, for example, a printing application 641 for performing printing processing based on a print job received from the host PC via the external device I/F 112, a maintenance application 642 for performing head cleaning and consumables exchange processing, etc.

The engine domain 650 includes an engine Mgr task 651 that manages the state transition by the engine domain 650 and an engine periodic handler 652 that performs generation of timing necessary for various kinds of periodic processing under the management of the engine Mgr task 651. Further, the engine domain 650 includes an image printing system sub domain 657, a recovery system sub domain 658 that provides a cleaning function of the printing apparatus, such as head cleaning, and in ink supply system sub domain 653. The ink supply system sub domain 653 includes a supply system Drv task 655 that controls supply system hardware and a supply system Mgr task 656 that manages the state of the ink supply system sub domain 653.

Hereinafter, processing that is performed by the apparatus having the configuration described previously is explained.

(Ink Tank State Monitoring Processing)

Figure 7:
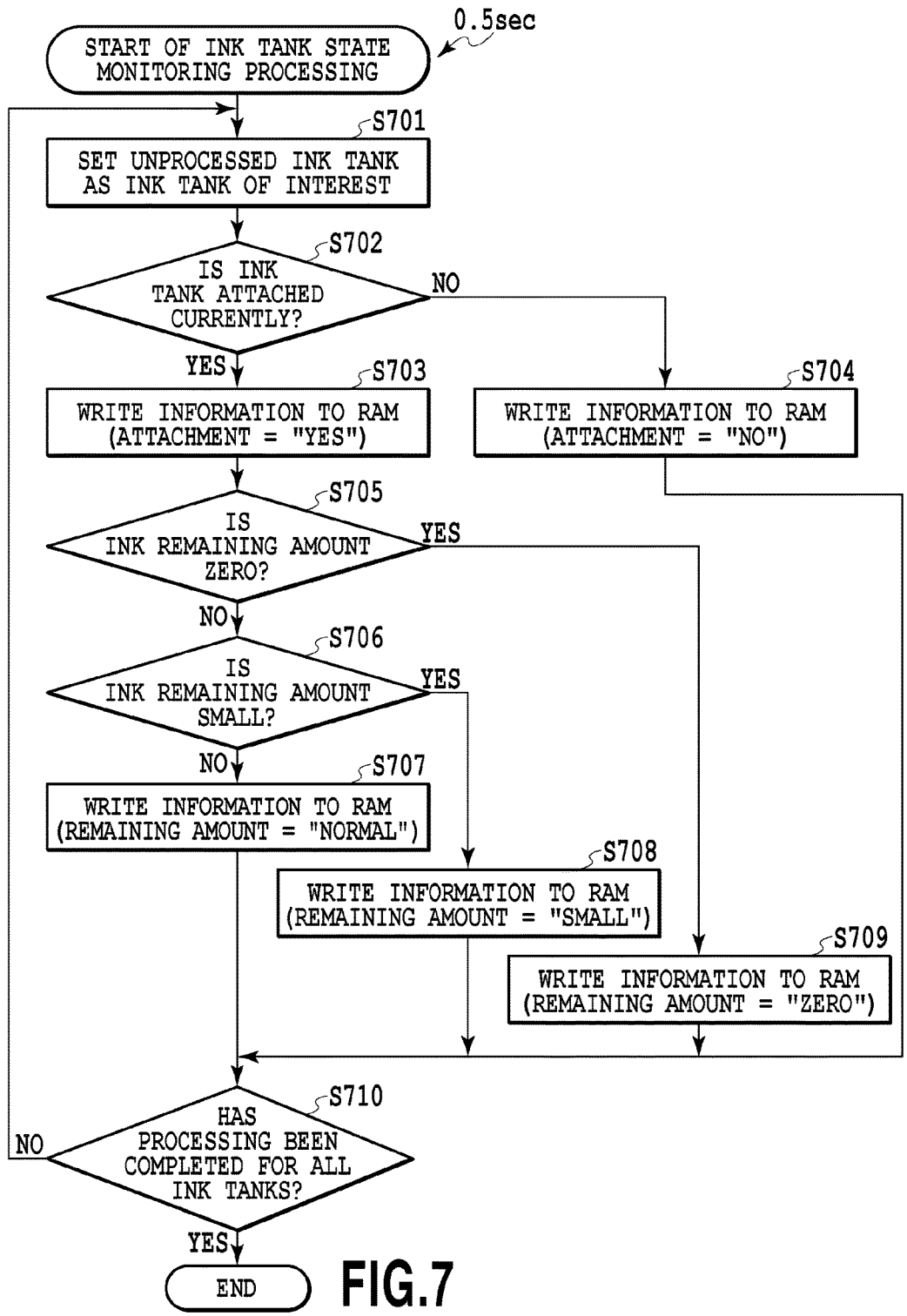
FIG. 7 is a flowchart of ink tank state monitoring processing.

FIG. 7 is a flowchart of ink tank state monitoring processing in the engine periodic handler 652. The ink tank state monitoring processing is activated periodically by interrupt processing at 0.5 sec intervals by the engine periodic handler 652 and finally, information indicating whether or not an ink tank is attached and information indicating the ink remaining amount are saved in the RAM 104.

First, at step S701, the CPU 102 sets an unprocessed ink tank as an ink tank of interest. Next, the processing proceeds to step S702.

At step S702, the CPU 102 determines whether or not the ink tank of interest is currently attached. As described previously, in the case where the ink tank supply port 401 is coupled correctly with the joint unit 301, the connector 406 and the connector included in the pump unit 302 are connected, and therefore, it is possible for the CPU 102 to recognize that the ink tank is attached. In the case where the result of the determination at step S702 indicates that the ink tank of interest is currently attached, the processing proceeds to step S703. On the other hand, in the case where the ink tank of interest is not attached currently, the processing proceeds to step S704.

At step S703, the CPU 102 writes the information indicating that the ink tank of interest is attached currently to the RAM 104 (attachment="YES" is set). Next, the processing proceeds to step S705.

At step S704, the CPU 102 writes the information indicating that the ink tank of interest is not attached currently to the RAM 104 (attachment="NO" is set). In this case, the determination of the ink remaining amount within the ink tank of interest is not performed. Next, the processing proceeds to step S710.

At step S705, the CPU 102 determines whether or not the ink remaining amount within the ink tank of interest is zero (whether or not the ink tank is empty). For this determination, the result of the detection by the liquid surface level sensor 404 is used. In other words, in the case where the result of the detection by the liquid surface level sensor 404 is "OFF", it is determined that the ink remaining amount is zero and in the case where the result of the determination by the liquid surface level sensor 404 is "ON", it is determined that the ink remaining amount is not zero. In the case where the result of the determination at step S705 indicates that the ink remaining amount is zero, the processing proceeds to step S709. On the other hand, in the case where the ink remaining amount is not zero, the processing proceeds to step S706.

At step S706, the CPU 102 determines whether or not the ink remaining amount within the ink tank of interest is small. For this determination, the result of the detection by the liquid surface level sensor 403 is used. In other words, in the case where the result of the detection by the liquid surface level sensor 403 is "OFF", it is determined that the ink remaining amount is small and in the case where the result of the detection by the liquid surface level sensor 403 is "ON", it is determined that the ink remaining amount is not small (sufficient). In the case where the result of the determination at step S706 indicates that the ink remaining amount is small, the processing proceeds to step S708. On the other hand, in the case where the ink remaining amount is not small, the processing proceeds to step S707.

At step S707, the CPU 102 writes the information indicating that the ink remaining amount within the ink tank of interest is sufficient to the RAM 104 (remaining amount="Normal" is set). Next, the processing proceeds to step S710.

At step S708, the CPU 102 writes the information indicating that the ink remaining amount within the ink tank of interest is small to the RAM 104 (remaining amount="Small" is set). Next, the processing proceeds to step S710.

At step S709, the CPU 102 writes the information indicating that the ink remaining amount within the ink tank of interest is zero to the RAM 104 (remaining amount="Zero" is set). Next, the processing proceeds to step S710.

At step S710, the CPU 102 determines whether or not the information indicating the state of the ink tank (ink tank state information) for all the ink tanks has been acquired and saved. In the case where the result of the determination at step S710 indicates that the ink tank state information for all the ink tanks has been acquired and saved, the present processing is terminated. On the other hand, in the case where the ink tank state information for all the ink tanks has not been acquired or saved, the processing returns to step S701.

The above is the contents of the ink tank state monitoring processing.

(Ink-Run-Out Error Determination Processing)

In the case where there are one or more ink tanks within which the ink remaining amount is zero, it is no longer possible for the printing apparatus 101 to perform printing temporarily because of the ink-run-out error state.

Figure 8:
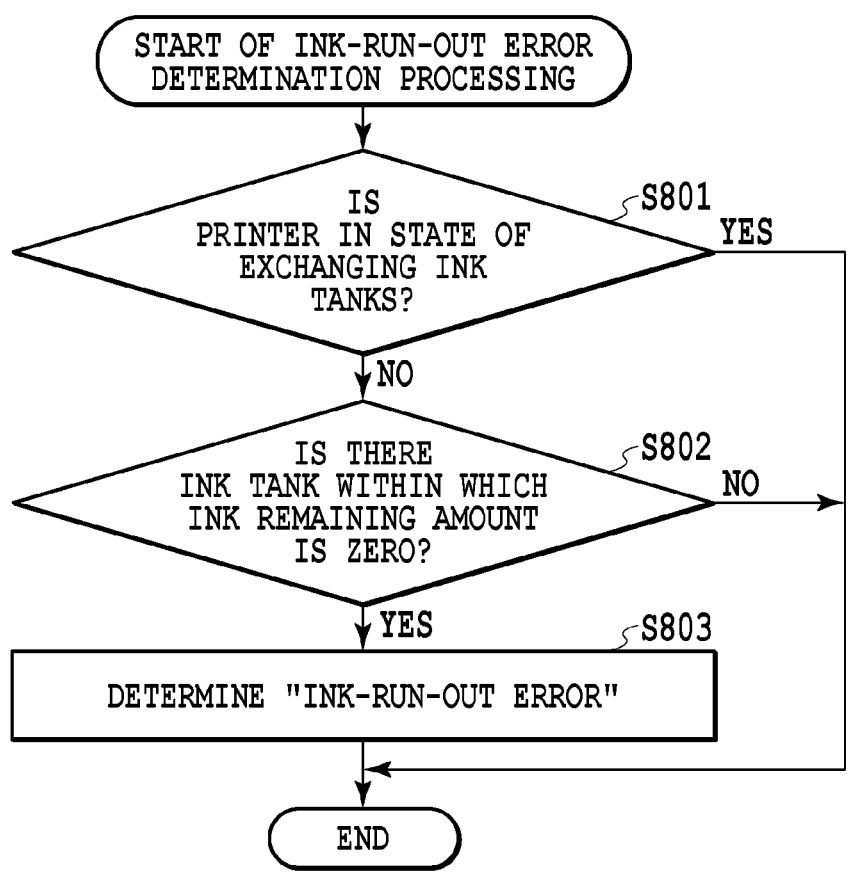
FIG. 8 is a flowchart of ink-run-out error determination processing.

FIG. 8 is a flowchart of ink-run-out error determination processing in the engine Mgr task 651. The ink-run-out error determination processing is performed at timing determined by the designer of the printing apparatus 101, such as at the time of start of printing, at the time between printing of a certain page and printing of the next page in printing of a plurality of pages and at the time of the printing apparatus making a transition into a standby state after printing ends.

First, at step S801, the CPU 102 determines whether or not the printing apparatus 101 is in the state of exchanging ink tanks. This determination is performed to prevent the state of the printing apparatus (printing impossible state) during the period of time of ink tank exchange during which an ink tank is extracted or inserted from being determined to be an error state. For example, it is possible to perform this determination based on the open/closed state of the ink tank cover 126. Specifically, in the case where the ink tank cover 126 is open, it is determined that ink tanks are being exchanged and in the case where the ink tank cover 126 is closed, it is determined that ink tanks are not being exchanged. In the case where the result of the determination at step S801 indicates that the printing apparatus 101 is in the state of exchanging ink tanks, the present processing is terminated. On the other hand, in the case where the printing apparatus 101 is not in the state of exchanging ink tanks, the processing proceeds to step S802.

At step S802, the CPU 102 determines whether or not there is an ink tank within which the ink remaining amount is zero. For this determination, the ink remaining amount parameter that is saved in the RAM 104 by the ink tank state monitoring processing described previously is used. In the case where there are one or more ink tanks within which the remaining amount is "Zero", it is determined that there is an ink tank within which the ink remaining amount is zero, and the processing proceeds to step S803. On the other hand, in the case where there is no ink tank within which the remaining amount is "Zero", it is determined that there is no ink tank within which the ink remaining amount is zero, and the present processing is terminated.

At step S803, the CPU 102 determines that the printing apparatus 101 is in the ink-run-out error state. Information indicating the occurrence of ink-run-out error is distributed from the engine domain 650 to another domain by making use of the message notification function of the embedded OS 600.

The above is the contents of the ink-run-out error determination processing. In the case where the printing apparatus 101 is in the ink-run-out error state, it is not possible to perform printing processing until a user exchanges ink tanks. Consequently, on the liquid crystal display 106 of the operation panel 105, a user is notified of the ink-run-out error and a screen on which the user is prompted to exchange ink tanks is displayed.

(Display Transition of UI Screen on Liquid Crystal Display)

Figure 9:
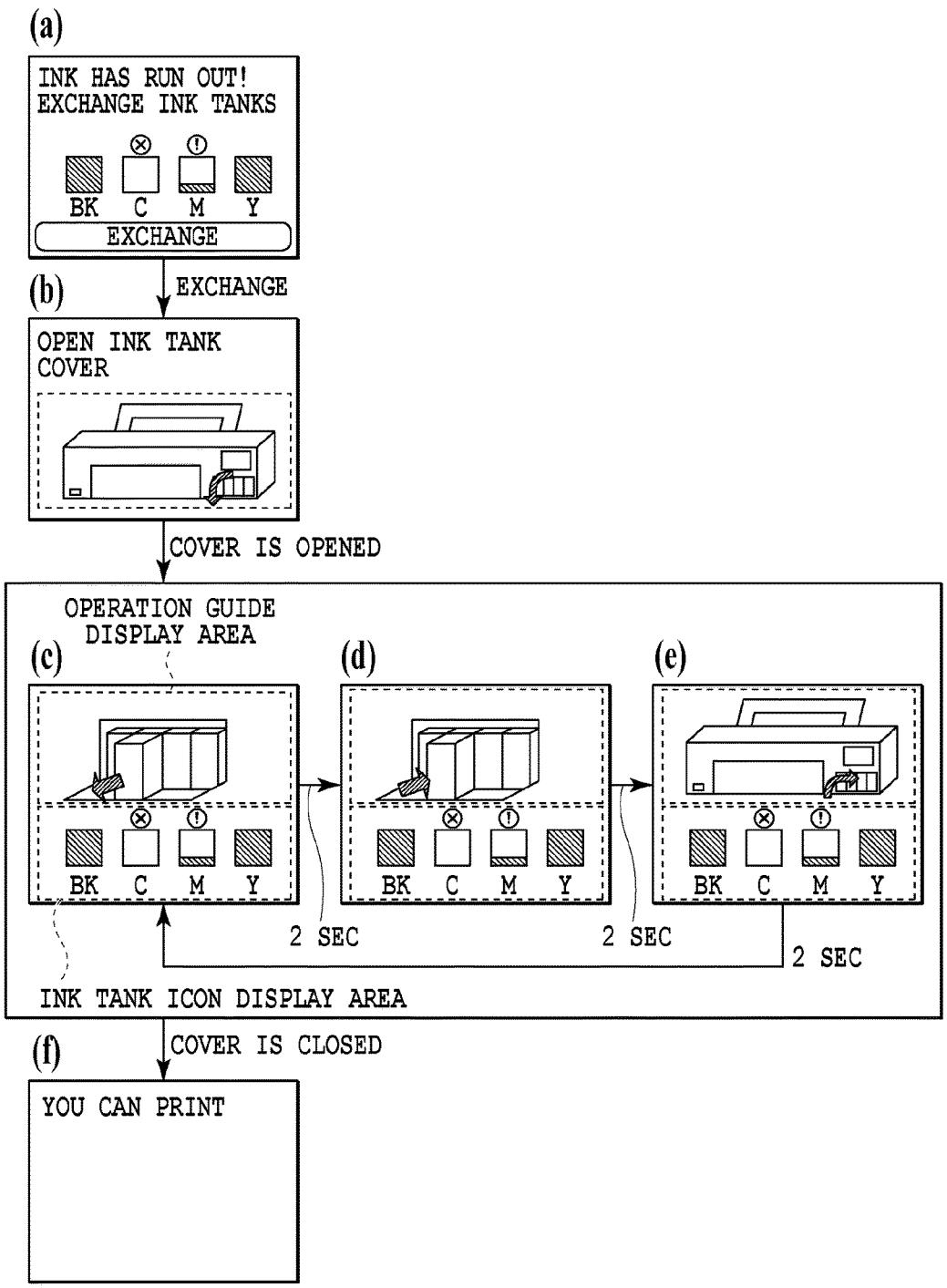
FIG. 9 is a diagram showing a display transition of a UI screen in a liquid crystal display.

FIG. 9 is a schematic diagram showing an example of the display transition of the UI screen on the liquid crystal display 106 of the printing apparatus 101, representing the display transition from the occurrence of ink-run-out error until the printing apparatus 101 returns to the printing possible state. It is possible for a user to perform the task relating to the ink exchange in accordance with the explanation within the screen by viewing the screen display that changes sequentially.

In FIG. 9, (a) is a screen notifying a user that an ink-run-out error has occurred, which is displayed on the liquid crystal display 106 immediately after the ink-run-out error has occurred. As shown in (a) in FIG. 9, at the top on the screen, a message indicating that ink has run out and prompting a user to exchange ink tanks is displayed. Further, under the message, an icon for each ink tank (i.e., a square icon, or a combination of a square icon and an icon enclosed by a small circle) is displayed. Here, the square icon is an icon indicating the ink remaining amount within the ink tank and the icon enclosed by a small circle is an icon indicating an ink tank to be exchanged or an ink tank that will need to be exchanged in the near future.

In the example in (a) in FIG. 9, among the ink tanks of respective colors, the ink remaining amount within the C ink tank becomes zero, the ink remaining amount within the M ink tank is small, but the M ink tank does not need to be exchanged right now, and the ink remaining amounts within the BK ink tank and within the Y ink tank are sufficient. Consequently, in this example, it is necessary to exchange the C ink tank, and therefore, an "Exchange" button is arranged at the bottom on the screen. In the case where a user presses down the "Exchange" button, the next screen (b) is displayed.

In FIG. 9, (b) is a screen prompting a user to open an ink tank cover 226 to exchange ink tanks. In the case where the user who sees the screen opens the ink tank cover 226, the next screen (c) is displayed.

In FIG. 9, (c) to (e) are screens (referred to as exchange guide screens) presenting the series of operations relating to the ink exchange to the user and the user actually exchanges ink tanks by viewing these screens. Each screen shown in (c) to (e) includes an operation guide display area at the top on the screen where an illustration for explanation is displayed and an ink tank icon display area at the bottom on the screen where the icon for each ink tank is displayed.

In the operation guide display area, illustrations explaining the exchange procedure are displayed, such as the screen (c) indicating how to extract an ink tank to be exchanged, the screen (d) indicating how to insert an ink tank, and the screen (e) indicating closing the ink tank cover 226 after inserting an ink tank. It may also be possible to display contents of drawings or photos, not limited to illustrations. The display in the operation guide display area is automatically updated at 2-sec intervals by a timer and the displays are repeated in the order of (c) to (e) until the user closes the ink tank cover 226.

In the ink tank icon display area, the icon for each ink tank is displayed, which indicates the current situation of the ink tank. The ink tank icons that are displayed in the ink tank icon display area are the same as the icons shown in (a) in FIG. 9, but in the ink tank icon display area, it is also possible to represent the ink tank extracted/inserted state by a display (details will be described later). The display relating to the ink tank extracted/inserted state is updated in accordance with extraction/insertion of the ink tank by a user independently of the timing of automatic updating of the display in the operation guide display area.

In FIG. 9, (f) is a screen notifying a user that printing is made possible, which is displayed after the user completes the ink tank exchange and closes the ink tank cover 226.

Due to the UI screens according to the present embodiment, it is made possible to explicitly indicate which ink tank has been extracted on the spot in the case where one of the ink tanks is extracted as well as explicitly indicating which of the plurality of ink tanks should be exchanged at the time of the ink tank exchange task.

As shown in (c) to (e) in FIG. 9, while a user is exchanging ink tanks, the procedure of the ink exchange is updated automatically. During the ink exchange, for example, there is a possibility that the user will be performing the operation to take out the ink tank that is attached to the printing apparatus or the like. Because of this, there is a case where it is difficult for the user to perform, for example, the operation to switch the displays. Consequently, by automatically updating the displays in (c) to (e) as described above, it is possible for the user to easily recognize the procedure of the ink tank exchange while performing the operation to take out the ink tank or the like.

Further, as shown on in (c) to (e), the operation guide display area and the ink tank icon display area are displayed at the same time. Because of this, it is possible for the user to recognize the contents of the operation and the ink tank to be exchanged at the same time.

(Display Transition in Ink Tank Icon Display Area)

Figure 10:
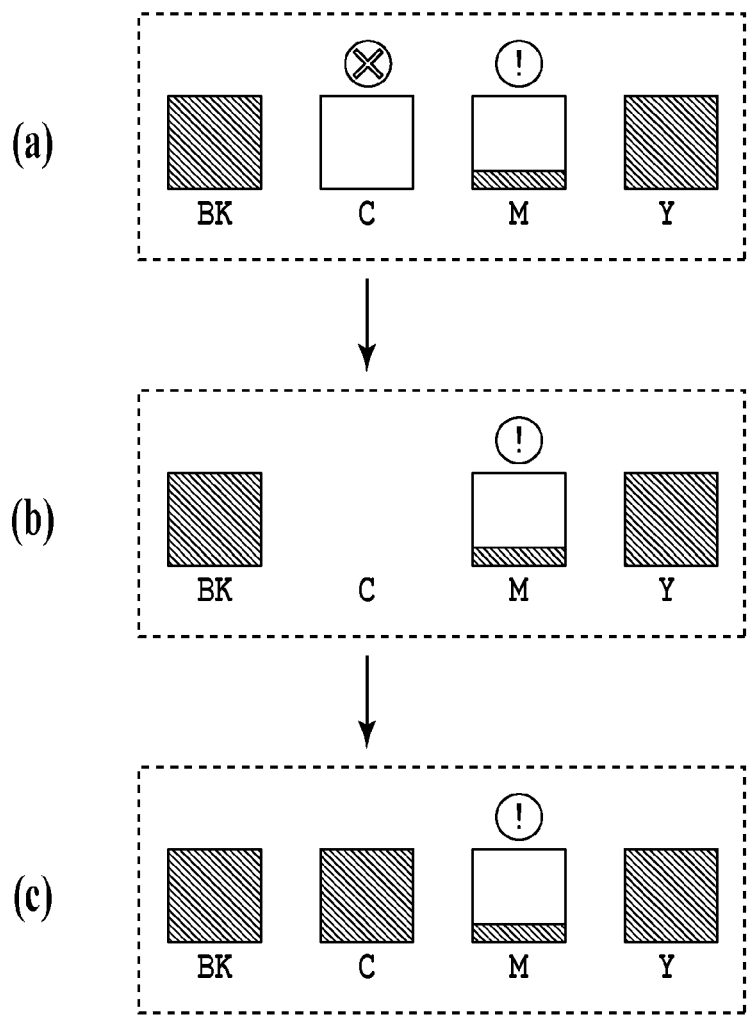
FIG. 10 is a diagram showing a display transition in an ink tank icon display area.

FIG. 10 is a schematic diagram showing an example of the display transition in the ink tank icon display area in FIG. 9.

In FIG. 10, (a) shows the state at the time of start of ink tank exchange task. This display notifies a user that the cyan ink has run out and prompts the user to extract the C ink tank. In the case where the C ink tank is extracted in this state, the next screen (b) is displayed.

In FIG. 10, (b) shows the state where the C ink tank has been extracted. As shown in (b), the icon corresponding to the C ink tank (i.e., the icon displayed above the character "C" in (a)) has disappeared, and therefore, it is possible for the user to check that the C ink tank has been extracted correctly. In the case where the C ink tank filled with cyan ink is inserted in this state, the next screen (c) is displayed.

In FIG. 10, (c) shows the state where the C ink tank filled with cyan ink has been attached. As shown in (c), the icon above the character "C" having been absent in the state of in (b) is displayed again, and therefore, it is possible for the user to check that the C ink tank has been attached. Further, it is possible to know that the ink remaining amount is normal by the icon that is displayed at this time, and therefore, it is possible for the user to check that the C ink tank exchange has been performed correctly.

(Ink-Run-Out Error Processing)

Hereinafter, the sequence control in the software for implementing the display transition described previously is explained.

Figure 11:
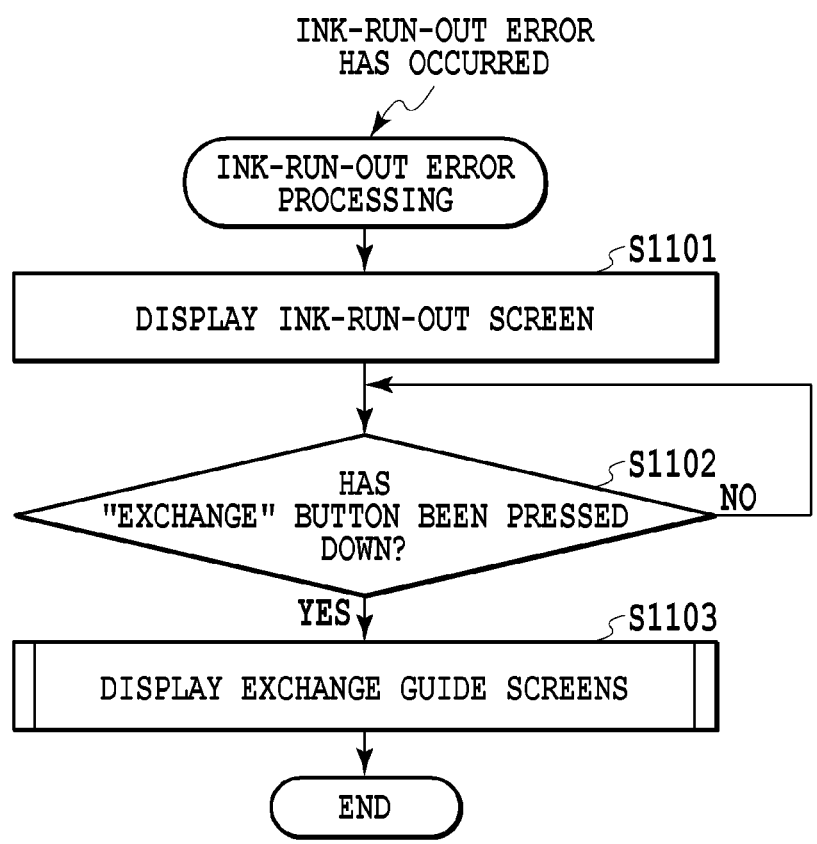
FIG. 11 is a flowchart of ink-run-out error processing.

FIG. 11 is a flowchart of ink-run-out error processing in the UIMgr task 631.

In the case where information indicating the occurrence of ink-run-out error issued from the engine Mgr task 651 is distributed within the UI domain 630 and the UIMgr task 631 receives the information, the ink-run-out error processing starts.

First, ate step S1101, the CPU 102 displays a screen notifying a user that an ink-run-out error has occurred as shown in (a) in FIG. 9. Next, the processing proceeds to step S1102.

At step S1102, the CPU 102 determines whether or not the "Exchange" button has been pressed down. In the case where the result of the determination at step S1102 indicates that the "Exchange" button has been pressed down, the processing proceeds to step S1103. On the other hand, in the case where the "Exchange" button has not been pressed down, the processing stands by until the "Exchange" button is pressed down.

At step S1103, the CPU 102 displays the exchange guide screens (see (b) to (e) in FIG. 9). Then, in the case where the user correctly performs the ink tank exchange by viewing the exchange guide screens and then the display of the exchange guide screens ends, the present processing ends.

(Exchange Guide Screen Display Processing)

FIG. 12A to FIG. 12C are flowcharts relating to exchange guide screen display processing in the screen Mgr task 633. Hereinafter, the case where the display transition between the screens shown in (b) to (e) in FIG. 9 is controlled is explained.

FIG. 12A is a detailed flowchart of the exchange guide screen display processing (step S1103 in FIG. 11).

First, at step S1201, the CPU 102 displays a screen prompting a user to open the ink tank cover 226 (see (b) in FIG. 9). Next, the processing proceeds to step S1202.

At step S1202, the CPU 102 determines whether or not the ink tank cover 226 has been opened by the user. In the case where the result of the determination at step S1202 indicates that the ink tank cover 226 has been opened, the processing proceeds to step S1203. On the other hand, in the case where the ink tank cover 226 remains closed, the processing stands by until the ink tank cover 226 is opened.

At step S1203, the CPU 102 initializes an illustration number N for specifying an illustration (hereinafter, an operation guide illustration) to be displayed in the operation guide display area, i.e., N=1 is set. In the present embodiment, the three operation guide illustrations are displayed in the state where the ink tank cover 226 is open (see (c) to (e) in FIG. 9), and therefore, it is assumed that N takes one of 1 to 3. Next, the processing proceeds to step S1204.

At step S1204, the CPU 102 updates the display of the exchange guide screen (details will be described later). Next, the processing proceeds to step S1205.

At step S1205, the CPU 102 determines whether or not the ink tank cover 226 has been closed by the user. In the case where the result of the determination at step S1205 indicates that the ink tank cover 226 has been closed, the present processing is terminated. On the other hand, in the case where the ink tank cover 226 remains open, the processing returns to step S1204.

The above is the contents of the exchange guide screen display processing.

(Display Updating Processing of Exchange Guide Screen)

FIG. 12B is a detailed flowchart of the display updating processing of the exchange guide screen (step S1204).

First at step S1210, the CPU 102 determines whether or not a display updating interval (two seconds) in the operation guide display area has elapsed. In the case where the result of the determination at step S1210 indicates that the display updating interval has elapsed, the processing proceeds to step S1212. On the other hand, in the case where the display updating interval has not elapsed, the processing proceeds to step S1214.

At step S1212, the CPU 102 updates the illustration number (details will be described later). Next, the processing proceeds to step S1213.

At step S1213, the CPU 102 initializes an updating interval counter. Next, the processing proceeds to step S1215.

At step S1214, the CPU 102 determines whether or not the ink tank extracted/inserted state has changed. In the case where the result of the determination at step S1214 indicates that the ink tank extracted/inserted state has changed, the processing proceeds to step S1215. On the other hand, in the case where the ink tank extracted/inserted state has not changed, the present processing is terminated.

At step S1215, the CPU 102 displays an updated exchange guide screen (hereinafter, updated screen) (details will be described later). After this, the present processing is terminated.

The above is the display updating processing of the exchange guide screen.

(Illustration Number Updating Processing)

FIG. 12C is a detailed flowchart of illustration number updating processing (step S1212). The present processing is performed to sequentially update the displays in the operation guide display area, specifically, to repeatedly display the three operation guide illustrations.

First, at step S1221, the CPU 102 increments the illustration number (N=N+1). The incrementing is performed to acquire the operation guide illustration to be displayed next after the operation guide illustration being currently displayed. Next, the processing proceeds to step S1222.

At step S1222, the CPU 102 determines whether or not the illustration number incremented at step S1221 is greater than a threshold value max. In the present embodiment, the three operation guide illustrations are displayed, and therefore, max=3. In the case where the result of the determination at step S1222 indicates that the illustration number is greater than the threshold value max, the processing proceeds to step S1223. On the other hand, in the case where the illustration number is less than or equal to the threshold value max, the present processing is terminated.

At step S1223, the CPU 102 sets the illustration number to the initial value (N=1). This processing is performed to display the first operation guide illustration again after displaying the third operation guide illustration among the three operation guide illustrations. After step S1223, the present processing is terminated.

The above is the contents of the illustration number updating processing.

(Updated Screen Display Processing)

FIG. 13A to FIG. 13C are diagrams relating to updated screen display processing in the panel task 634.

FIG. 13A is a detailed flowchart of the updated screen display processing (step S1215).

First, at step S1301, the CPU 102 writes image data that is used to draw the operation guide display area among the image data displayed on the liquid crystal display 106 to a VRAM (details will be described later). Next, the processing proceeds to step S1302.

At step S1302, the CPU 102 writes image data that is used to draw the ink tank icon display area among the image data displayed on the liquid crystal display 106 to the VRAM (details will be described later). Next, the processing proceeds to step S1303.

At step S1303, the CPU 102 displays the updated screen on the liquid crystal display 106 based on the image data saved in the VRAM. After this, the present processing is terminated.

The above is the contents of the updated screen display processing.

(Write of Image Data for Drawing Operation Guide Display Area to VRAM)

FIG. 13B is a detailed flowchart of processing to write image data that is used to draw the operation guide display area to the VRAM (step S1301).

First, at step S1311, the CPU 102 acquires the operation guide illustration corresponding to the current illustration number from the RAM 104. Next, the processing proceeds to step S1312.

At step S1312, the CPU 102 writes the operation guide illustration acquired at step S1311 to the VRAM. After this, the present processing is terminated.

The above is the contents of the processing to write the image data for drawing the operation guide display area to the VRAM.

(Write of Image Data for Drawing Ink Tank Icon Display Area to VRAM)

FIG. 13C is a detailed flowchart of processing to write image data that is used to drawn the ink tank icon display area to the VRAM (step S1302).

First, at step S1321, the CPU 102 sets an unprocessed ink tank as an ink tank of interest. Next, the processing proceeds to step S1322.

At step S1322, the CPU 102 acquires information on the attachment state and the ink remaining amount with respect to the ink tank of interest. As the information that is acquired here, the data saved in the RAM 104 at steps S703, S704, S707, S708, S709, etc., in FIG. 7 is used. Next, the processing proceeds to step S1323.

At step S1323, the CPU 102 determines an icon for the ink tank of interest by searching a table in which icons are saved by using the information acquired at step S1322. FIG. 13D is a diagram showing an example of the table. Next, the processing proceeds to step S1324.

At step S1324, the CPU 102 writes the image data of the icon determined at step S1323 to the VRAM. Next, the processing proceeds to step S1325.

At step S1325, the CPU 102 determines whether or not the icon image data for all the ink tanks has been saved in the VRAM. In the case where the result of the determination at step S1325 indicates that the icon image data for all the ink tanks has been saved in the VRAM, the present processing is terminated. On the other hand, in the case where the icon image data for all the tank inks has not saved in the VRAM, the processing returns to step S1321.

By the present processing, the image data for drawing the ink tank icon display area in which icons for ink tanks are arranged is created.

The above is the contents of the processing to write image data for drawing the ink tank icon display area to the VRAM.

The above is the contents of the first embodiment. As described above, the printing apparatus according to the present embodiment does not require an LED for each ink tank, which reports the ink remaining amount. Consequently, it is possible to provide the printing apparatus at a low cost and also to prevent the quality of the design of the external appearance from deteriorating.

In the explanation described above, the case where the ink jet printer is used as the printing apparatus is explained, but it is possible to apply the present embodiment to any printing apparatus to which a plurality of user-exchangeable color material containers is attached, and for example, it is also possible to apply the present embodiment to a photoelectric printer.

Second Embodiment

In the present embodiment, examples of icons different from the icons indicating the ink remaining amount in the first embodiment are shown.

Figure 14A:
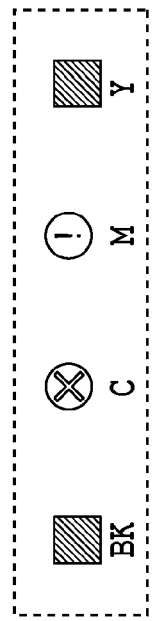
FIG. 14A, FIG. 14B, FIG. 14C, and FIG. 14D are diagrams each showing a display example in the ink tank icon display area.
Figure 14B:
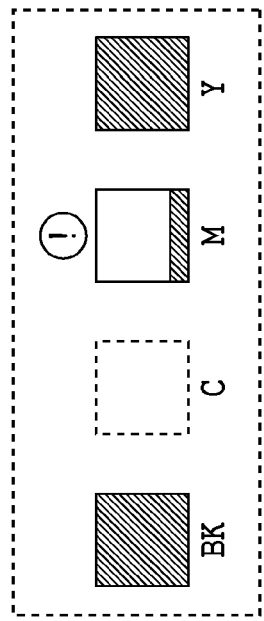

FIG. 14A to FIG. 14D are diagrams each showing an example of a display in the ink tank icon display area. Here, FIG. 14A and FIG. 14B show the same display examples as those of the first embodiment (see (a) and (b) in FIG. 10).

In the example in FIG. 14A, as the icons indicating the state where the ink remaining amount is zero and the state where the ink remaining amount is small, the combinations of the square icon indicating the ink remaining amount and the icon enclosed by a small circle above the square icon, which indicates the status of ink remaining amount (i.e., the timing of ink tank exchange), are used. The display method such as this requires a large space for displaying the icons, and therefore, is not suitable to a printing apparatus with a large number of ink tanks that are attached or a printing apparatus having a small operation display, and therefore, a small icon display area.

Figure 14C:
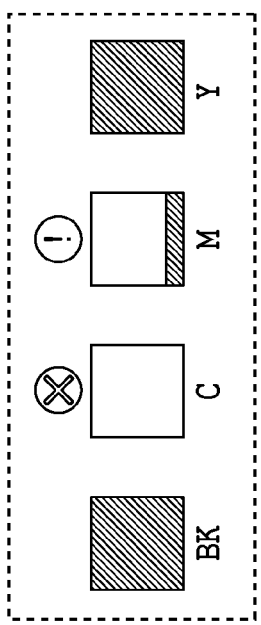

In the present embodiment, as shown in FIG. 14C, as icons indicating the state where the ink remaining amount is zero and the state where the ink remaining amount is small for part of the ink tanks, only icons enclosed by a small circle, which indicate the status of ink remaining amount, are used in place of the square icons. Due to this, the space occupied by the displayed icons can be reduced as compared to that of the first embodiment. For example, referring to FIG. 14C, no square icon is displayed for the C ink tank, but the icon enclosed by a small circle, which indicates the status of ink remaining amount, is displayed, and therefore, it is possible for a user to know that the C ink tank needs to be exchanged. The square icon is also not displayed for the M ink tank, but the icon enclosed by a small circle, which indicates the status of ink remaining amount, is displayed, and therefore, it is possible for a user to know that the ink remaining amount within the M ink tank becomes small, but it is not necessary to exchange right now.

Figure 14D:
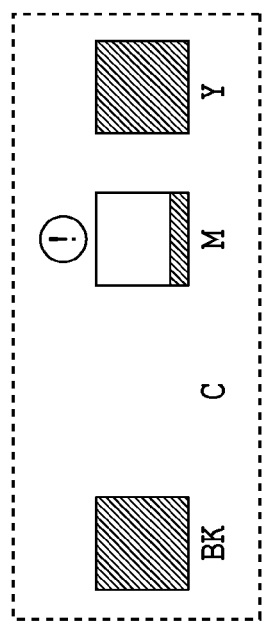

In the example in FIG. 14B, the case is shown where the icon for the C ink tank disappears on a condition that the C ink tank has been extracted from the printing apparatus. However, as another display method in the case where the C ink tank has been extracted from the printing apparatus, for example, a broken-line squire icon as shown in FIG. 14D may be displayed. By viewing the square icon represented by the broken line, it is possible for a user to know that the C ink tank has been extracted.

Third Embodiment

In the present embodiment, an icon display method in the ink tank icon display area is explained, which is more convenient for a user at the time of ink exchange than those of the embodiments described previously.

In the first embodiment, as the table holding the icon images, the table shown in FIG. 13D is used, but in the present embodiment, a table shown in FIG. 15 is used. As shown in FIG. 13D, in the first embodiment, in the state where the ink tank is not attached, an icon image associated with the ink remaining amount and the ink tank attachment state is not held. On the other hand, in the present embodiment, as shown in FIG. 15, in the state where the ink tank is not attached, the icon image associated with the ink remaining amount and the ink tank attachment state is held. These icon images are drawn by using the broken line in place of the solid line of the icon images that are held in association with the ink remaining amount and the ink attachment state in the state where the ink tank is attached.

By using the table shown in FIG. 15, even in the case where the ink tank has been extracted, it is made possible for a user to check the state of the extracted ink tank (i.e., the state where the ink remaining amount is sufficient, small, or zero). Hereinafter, explanation is given by using a specific example.

Figure 16:
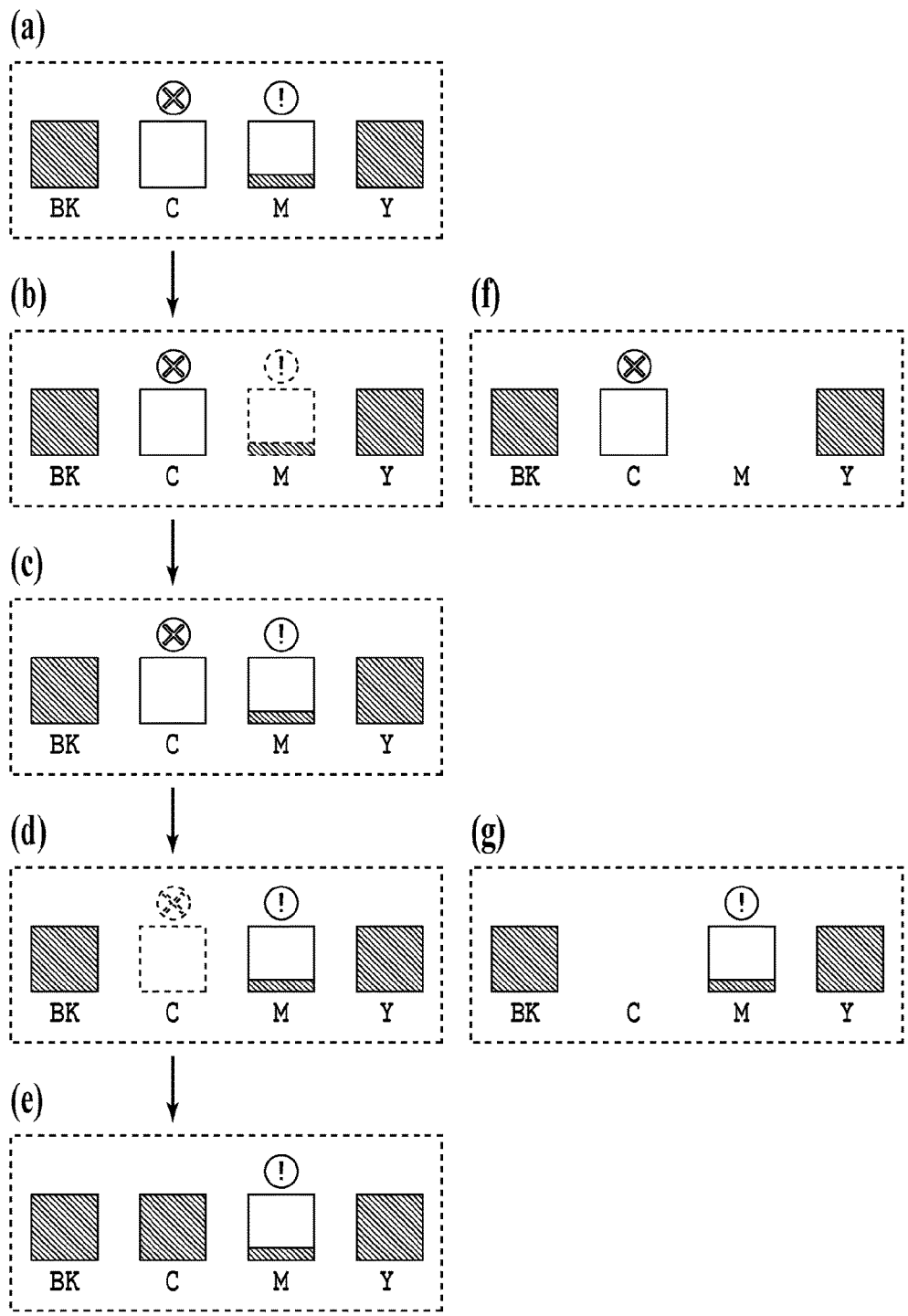
FIG. 16 is a diagram showing a display transition in the ink tank icon display area.

FIG. 16 is a schematic diagram showing the display transition in the ink tank icon display area according to the present embodiment.

In FIG. 16, (a) indicates the state at the time of start of ink tank exchange. By viewing this display, it is possible for a user to know that the ink tank to be exchanged is the C ink tank. Here, the case is supposed where the user has erroneously extracted the M ink tank adjacent to the C ink tank. At this time, the display in the ink tank icon display area is as (b) in FIG. 16, and therefore, it is possible for the user to see the icon for the M ink tank, which is represented by the broken line. Consequently, it is possible for the user to know that the ink remaining amount is small but ink remains and that the M ink tank that should not be extracted has been extracted, and therefore, the user inserts the M ink tank again. Then, the display becomes as shown in (c) in FIG. 16. Then, the user extracts the C ink tank that should be exchanged (displayed as in (d) in FIG. 16), and attaches a new C ink tank (displayed as in (e) in FIG. 16).

In FIG. 16, (f) and (g) are diagrams showing the displays in the first embodiment, corresponding to (b) and (d) in FIG. 16. By comparing (b) and (f) in FIG. 16 or (d) and (g) in FIG. 16, it is known that the present embodiment is superior to the first embodiment in that it is possible to visually recognize the ink remaining amount of the extracted ink tank.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Due to the present invention, it is made possible for a user to correctly exchange color material containers of a printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-108697, filed May 28, 2015, which is hereby incorporated by reference wherein in its entirety.

What is claimed is:

1. A printing apparatus to which a plurality of user-exchangeable color material containers is attached, the printing apparatus comprising:
   a display configured to display a user interface screen having a first display area in which contents explaining a procedure for exchanging a color material container are displayed and a second display area in which a display item relating to a remaining amount of color material in a color material container is displayed, wherein the first display area and the second display area are included in a same screen; and
   a processor configured to control the display,
   wherein the processor controls the user interface screen such that the contents in the first display area are automatically updated in sequence without an operation by a user, and the display item in the second display area is updated by an operation by the user.

2. The printing apparatus according to claim 1, wherein each of the plurality of color material containers comprises a remaining amount detector configured to detect a remaining amount of a color material.

3. The printing apparatus according to claim 2, wherein the remaining amount detector includes a unit configured to detect that a remaining amount of a color material is small and a unit configured to detect that a remaining amount of a color material is zero.

4. The printing apparatus according to claim 1, further comprising a unit configured to acquire first information for specifying whether or not each of the plurality of color material containers is attached to the printing apparatus, and second information relating to a remaining amount of a color material, wherein
the display displays the display item in the second display area based on the acquired first information and the acquired second information.

5. The printing apparatus according to claim 4, wherein the second display area is updated in accordance with extraction/insertion of a color material container by the user, based on the acquired first information.

6. The printing apparatus according to claim 5, wherein in a case where a color material container has been extracted, the display displays the display item with which the user can visually recognize a remaining amount of the extracted color material container.

7. The printing apparatus according to claim 5, wherein a plurality of display items for color material containers are updated concurrently in the second display area.

8. The printing apparatus according to claim 1, wherein in the displaying in the sequence by automatically updating, a display state in the first display area is changed from a first state in which a first content in the contents is displayed and a second content in the contents is not displayed, to a second state in which the first content is not displayed and the second content is displayed.

9. The printing apparatus according to claim 1, wherein the display item indicates the remaining amount of color material.

10. The printing apparatus according to claim 9, wherein the display displays an icon which includes a first display item indicating the remaining amount of a color material included in a color material container or an icon which includes a second display item for prompting a user to exchange a color material container for each color material container in the second display area.

11. The printing apparatus according to claim 10, wherein the display displays an icon which includes the first display item and does not include the second display item or an icon which includes both of the first display item and the second display item for each color material container in the second display area.

12. The printing apparatus according to claim 1, wherein the processor acquires first information for specifying whether or not each of a plurality of color material containers is attached to the printing apparatus, and second information relating to a remaining amount of a color material, and
the processor controls the user interface screen, based on the first information and the second information, such that, in a case where a color material container for a predetermined color has been extracted, the display does not display the display item for the predetermined color, and in a case where a color material container for the predetermined color has been inserted, the display displays the display item corresponding to the inserted color material container.

13. The printing apparatus according to claim 1, wherein the processor acquires first information for specifying whether or not each of a plurality of color material containers is attached to the printing apparatus, and second information relating to a remaining amount of a color material,
the processor controls the user interface screen, based on the first information and the second information, and
each of updating for the contents in the first display area and updating for the second display area is independently performed.

14. The printing apparatus according to claim 13, wherein the updating for the contents in the first display area is performed every predetermined time, and the updating for the second display area is performed, irrelative to the predetermined time and in accordance with extraction/insertion of a color material container.

15. The printing apparatus according to claim 1, wherein the color material containers contain color material of different colors.

16. The printing apparatus according to claim 1, wherein the color material is ink.

17. The printing apparatus according to claim 1, further comprising a detector configured to detect whether or not a cover that opens/closes an insertion port through which the plurality of color material containers is attached has opened,
wherein the processor controls the user interface screen such that the contents in the first display area are automatically updated in sequence from the time the detector detects that the cover has opened to the time the detector detects that the cover has closed.

18. The printing apparatus according to claim 17, wherein the processor controls the user interface screen such that displaying of the user interface screen is finished based on the detector detecting that the cover has closed.

19. The printing apparatus according to claim 18, wherein in a case where a user completes color material container exchange and the detector detects that the cover has closed, the display finishes the display of the user interface screen and displays a screen notifying a user that printing is made possible.

20. A user interface screen displaying method performed by a printing apparatus to which a plurality of user-exchangeable color material containers is attached, the method comprising:
a step of displaying a user interface screen having a first display area in which contents explaining a procedure for exchanging a color material container are displayed and a second display area in which a display item relating to a remaining amount of color material in a color material container is displayed, wherein the first display area and the second display area are included in a same screen;
a step of controlling the user interface screen such that the contents in the first display area are automatically updated in sequence without an operation by a user, and the display item in the second display area is updated by an operation by the user.

21. The user interface screen displaying method according to claim 20, wherein
each of the plurality of color material containers comprises a remaining amount detector configured to detect a remaining amount of a color material.

22. The user interface screen displaying method according to claim 21, wherein the remaining amount detector includes a unit configured to detect that a remaining amount of a color material is small and a unit configured to detect that a remaining amount of a color material is zero.

23. The user interface screen displaying method according to claim 21, further comprising a step of acquiring first information specifying whether or not each of the plurality of color material containers is attached to the printing apparatus, and second information indicating a remaining amount of a color material, wherein
the display item is displayed in the second display area based on the acquired first information and the acquired second information.

24. The user interface screen displaying method according to claim 23, wherein
the second display area is updated in accordance with extraction/insertion of a color material container by the user, based on the acquired first information.

25. The user interface screen displaying method according to claim 24, wherein
in a case where a color material container has been extracted, the displaying step displays the display item with which the user can visually recognize a remaining amount of the extracted color material container.

26. The user interface screen displaying method according to claim 20, further comprising:
a step of acquiring first information for specifying whether or not each of a plurality of color material containers is attached to the printing apparatus, and second information relating to a remaining amount of a color material; and
a step of controlling the user interface screen, based on the first information and the second information, such that in a case where a color material container for a predetermined color has been extracted, the display item for the predetermined color is not displayed, and in a case where a color material container for the predetermined color has been inserted, the display item corresponding to the inserted color material container is displayed.

27. The user interface screen displaying method according to claim 20, further comprising:
a step of acquiring first information for specifying whether or not each of a plurality of color material containers is attached to the printing apparatus, and second information relating to a remaining amount of a color material; and
a step of controlling the user interface screen, based on the first information and the second information,
wherein each of updating for the contents in the first display area and updating for the second display area is independently performed.

28. A non-transitory computer-readable storage medium storing a program for causing a computer to perform a user interface screen displaying method performed by a printing apparatus to which a plurality of user-exchangeable color material containers is attached, the method comprising:
a step of displaying a user interface screen having a first display area in which contents explaining a procedure for exchanging a color material container are displayed and a second display area in which a display item relating to a remaining amount of color material in a color material container is displayed, wherein the first display area and the second display area are included in a same screen;
a step of controlling the user interface screen such that the contents in the first display area are automatically updated in sequence without an operation by a user, and the display item in the second display area is updated by an operation by the user.

* * * * *